Sept. 3, 1935.  E. DONNINI  2,013,459
MANUFACTURE OF GLASS SHEETS
Filed June 30, 1933  2 Sheets-Sheet 1
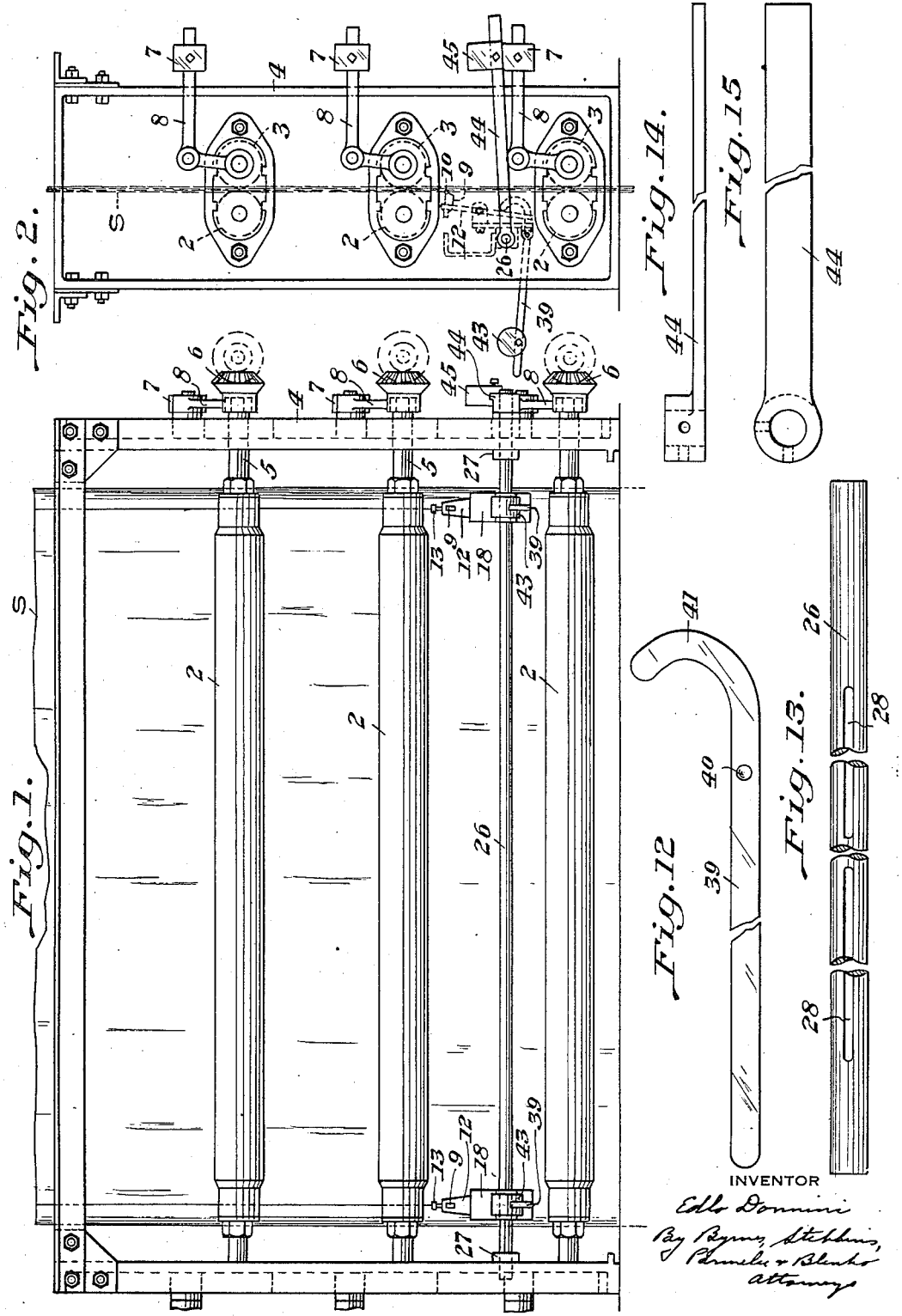

Sept. 3, 1935. E. DONNINI 2,013,459
MANUFACTURE OF GLASS SHEETS
Filed June 30, 1933 2 Sheets-Sheet 2
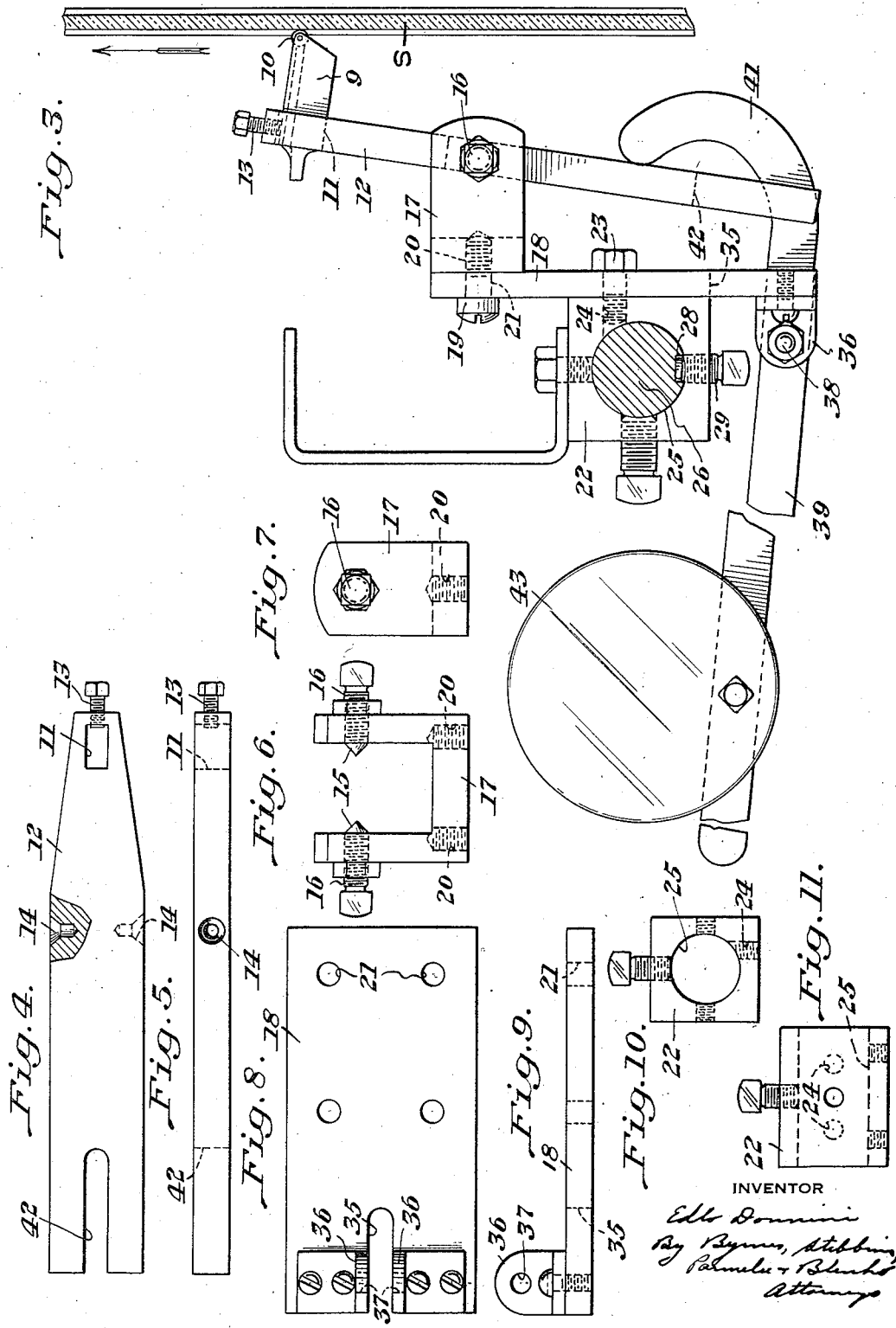

Patented Sept. 3, 1935

2,013,459

UNITED STATES PATENT OFFICE 2,013,459

MANUFACTURE OF GLASS SHEETS

Edlo Donnini, Jeannette, Pa., assignor to American Window Glass Company, Pittsburgh, Pa., a corporation of Pennsylvania Application June 30, 1933, Serial No. 678,461

4 Claims. (Cl. 49—48)

My invention relates generally to the manufacture of glass sheets, and more particularly to the cutting of the formed sheet, and provides an improved method and apparatus for removing objectionable edges of the formed sheet and for cutting the sheet to a desired size.

In the manufacture of glass sheets, the sheets are drawn from a bath of molten glass by means of draft rollers. The formed sheet in some processes, such as the Forcault process, is drawn vertically through an annealing or cooling tunnel, and when a sufficient length of the sheet has been formed and sufficiently cooled, the travelling sheet is scored cross-wise by a cutting tool, and that portion of the sheet above the score flexed relative to the remainder of the continuous sheet to cause the portion above the score to break away from the remainder of the sheet. In other processes, the formed sheet is drawn vertically by draft rollers and passes over suitably arranged horizontal rollers and continues through the annealing or cooling tunnel in a horizontal direction. In such processes when a sufficient length to form a sheet has been formed and sufficiently cooled, the horizontally travelling sheet is scored transversely thereof by a cutting tool, and the portion of the sheet beyond the score flexed relative to the remainder of the sheet to cause the portions to separate.

In the drawing of glass sheets, the edges thereof are not uniform in thickness or have been defaced by the drawing apparatus, and it is necessary to remove these edges. In some processes the edges assume the form of small bulbs and it is necessary to remove these so-called bulb edges in order to obtain a sheet of uniform thickness from one edge to the other.

Heretofore, these bulb edges or otherwise objectionable edges have been removed from the sheets after severance from the continuous sheet. Heretofore, the continuous sheet has been scored and the portion above the score flexed so as to sever the sheet from the continuous sheet, and the individual sheets then placed on cutting tables and the defective edges removed and the sheets then passed through the desired washing and drying operations. In some instances, the individual sheets, after severance from the continuous sheet, have been passed through the washing and drying operations and the defective edges removed thereafter. It has also heretofore been the practice to individually cut the severed sheets to appropriate widths after the washing and drying operations have been completed. My invention obviates this expensive handling and cutting of each individual glass sheet after severance from the continuous sheet.

By my invention I provide a method of and apparatus for removing the defective edges from the continuously rising sheet before it is severed into smaller sheets of the desired length. In accordance with my invention, not only may the continuously rising sheet be suitably scored for the removal of the defective edges before being severed into smaller sheets, but the sheet may be cut or scored to the appropriate width at the same time, thereby obviating the necessity of further cutting in order to obtain sheets of the desired size. It will be understood, of course, that a single score line adjacent each edge of the continuously rising glass sheet will be sufficient to both remove the defective edges and cut the sheet to the desired width. I have found that sheets cut in accordance with my invention are sufficiently accurate for commercial purposes, and that additional cutting thereof is entirely unnecessary. The elimination of the step of cutting the individual sheets for the removal of the defective edges and for cutting the sheets to the desired size, and the elimination of the handling of the sheets incident to the cutting materially reduces the cost of manufacture.

In the accompanying drawings, I have shown for purposes of illustration only a preferred embodiment of my invention. In the drawings the apparatus which I provide is shown applied to a drawing process wherein the continuously rising glass sheet is drawn vertically until cut to the desired lengths. It will be understood, however, that my invention may be applied to a horizontally travelling glass sheet and that it is not dependent upon the particular method of drawing used.

In the drawings—

Figure 1 is an elevational view showing that portion of the glass drawing apparatus adjacent the upper end of the annealing or cooling tunnel, in combination with the apparatus which I provide;

Figure 2 is an end elevational view of the apparatus shown in Figure 1 with the driving gears for the draft rollers removed;

Figure 3 is a side elevational view of the apparatus which I provide;

Figures 4 and 5 are detail views of the cutter holder;

Figures 6 and 7 are detail views of the pivot block adapted to carry the cutter holder shown in Figures 4 and 5;

Figures 8 and 9 are details of the plate adapted to carry the pivot block shown in Figures 6 and 7;

Figures 10 and 11 are detail views of the slide block on which the plate shown in Figures 8 and 9 is mounted;

Figure 12 is a detail view of the operating lever shown in Figure 3;

Figure 13 is a detail view of the rocker shaft on which the slide blocks are mounted; and Figures 14 and 15 are detail views of the weight lever carried by the rocker shaft.

As stated above, the glass is formed in continuous sheet form and is carried vertically by means of draft rollers located in the annealing or cooling tunnel. In the embodiment shown in the drawings, it is continued vertically by a plurality of pairs of draft rollers 2 and 3 carried by the frame 4. On one end of the shaft 5 of each roll 2 a driving gear 6 is mounted, which cooperates with suitable driving mechanism for driving the rolls. The rolls 3 may or may not be driven. They are forced into contact with the advancing glass sheet by weights 7 carried on bell cranks 8.

In accordance with my invention, I provide cutting mechanism for continuously scoring the formed continuous sheet longitudinally thereof as it is advanced by the draft rollers. The cutting apparatus shown in the drawings comprises two cutters 9 having cutter wheels 10 mounted thereon. These cutters 9 are mounted adjacent one face of the advancing sheet and each is located adjacent an edge thereof. Each cutter 9 is mounted in an opening 11 in the upper end of a cutter holder 12. Each cutter 9 is held in position in the opening 11 by means of a set screw 13. Each cutter holder 12 is provided with a tapered bearing 14 on each side thereof adapted to receive the tapered ends 15 of screws 16 threaded in a pivot block 17. The tapered portions 15 of the screws 16 form trunnions or pivots about which the cutter holder may rotate.

Each pivot block 17 is rigidly secured to a plate 18 by screws 19 which cooperate with threaded openings 20 in the pivot block 17. The screws 19 pass through openings 21 in said plate 18. Each plate 18 is mounted on a slide block 22 by bolts 23 threaded in threaded openings 24 in the slide block. Each block 22 is provided with a horizontally extending opening 25 adapted to receive the transversely extending rocker shaft 26. This rocker shaft 26 is mounted in bearings 27 carried by the main frame 4. The rocker shaft is provided with longitudinally extending keyways 28 which are adapted to receive the ends of set screws 29 threaded in each slide block for maintaining the rocker shaft in the desired position relative to the block.

The lower end of each plate 18 is slotted as indicated by the reference character 35. On either side of the slot 35 the plate is provided with upstanding lugs 36 having openings 37 therein for receiving a bolt 38. An operating lever 39 having an opening 40 therein for receiving the bolt 38 is mounted on the lower end of each plate 18 and extends through the slot in the bottom portion thereof. Each operating lever 39 has a curved end as indicated by the reference character 41, and extends through the slotted opening 42 in the lower end of the cutter holder 12. The curved end 41 of each operating lever is adapted to bear against the cutter holder so as to force the cutter carried by the cutter holder against the rising glass sheet S when raised. The other end of each operating lever 39 beyond the pivot bolt 38 is provided with a weight 43 for rotating the operating lever about its pivotal mounting and for forcing the cutter into engagement with the rising glass sheet S.

A weight lever 44 having a weight 45 thereon is mounted on the rocker shaft 26 adjacent one end thereof and suitably secured thereto. This weight lever aids in properly positioning the cutter with respect to the rising glass sheet.

As can be seen from the above description, the cutter by the mechanism which I provide is yieldably maintained against the rising glass sheet and will score the glass sheet as it is carried thereby. It will also be apparent that the cutters may be moved along the rocker shaft 26 so as to cut the rising glass sheet to any desired width.

After the rising glass sheet is scored longitudinally by the cutters above described, it is scored transversely to appropriate lengths and flexed along the score lines so as to provide a sheet of the desired size. It is apparent that by my invention glass sheets cut to the exact size desired may be obtained without transferring the sheets to cutting tables. The cost of manufacture is, therefore, materially reduced in view of the simplification of the cutting operations, and the elimination of the handling necessarily incident thereto.

While I have shown and described a preferred embodiment of my invention, it will be understood that I do not intend to be limited thereby, but that the invention may be otherwise embodied within the scope of the appended claims.

I claim:

1. Apparatus for cutting a moving continuous sheet of glass comprising a cutting tool mounted adjacent the path of travel of the glass sheet, an arm adapted to support said cutting tool adjacent one end thereof, means for pivotally supporting said arm intermediate the ends thereof, and a second lever pivotally mounted intermediate its ends for yieldably holding the cutter in cutting position against said glass as it moves past the cutter, one end of said second pivotally mounted lever being arranged to engage the end of said first mentioned lever for rotating it about its pivot point.

2. Apparatus for cutting a moving continuous sheet of glass comprising a rocker shaft extending transversely of the continuous glass sheet, a slide rock mounted on said shaft adjacent each end thereof, a cutter support carried by each slide block, a cutter carrying lever pivotally mounted intermediate its ends carried by each of said cutter supports, a cutter mounted on one end of each of said cutter carrying levers, and means engaging the opposite ends of each of said cutter carrying levers for yieldably holding the cutter carried thereby in cutting position against the glass sheet as it travels thereby.

3. Apparatus for cutting a moving continuous sheet of glass comprising a rocker shaft extending transversely of the continuous glass sheet, a slide block mounted on said shaft adjacent each end thereof, a cutter support carried by each slide block, a cutter carrying lever pivotally mounted intermediate its ends carried by each of said cutter supports, a cutter mounted on one end of each of said cutter carrying levers, and a lever pivotally mounted on each said cutter support intermediate its ends and arranged so that one end thereof engages the lower end of its cutter carrying lever for yieldably holding the cutter in cutting position against said glass sheet as it travels thereby.

4. Apparatus for cutting a moving continuous sheet of glass comprising a rocker shaft extending transversely of the continuous glass sheet, a slide block mounted on said shaft adjacent each end thereof, a cutter support carried by each slide block, a cutter carrying lever pivotally mounted intermediate its ends carried by each of said cutter supports, a cutter mounted on one end of each said cutter carrying levers, and a lever pivotally mounted on each said cutter support intermediate its ends and arranged so that one end thereof engages the lower end of its cutter carrying lever for yieldably holding the cutter in cutting position against said glass sheet as it travels thereby, each of said levers being biased to normally hold its cutter in cutting position.

EDLO DONNINI.